United States Patent
Lee et al.

(10) Patent No.: US 11,495,148 B2
(45) Date of Patent: Nov. 8, 2022

(54) DISPLAY APPARATUS

(71) Applicant: Samsung Electronics Co., Ltd., Suwon-si (KR)

(72) Inventors: Jaeneung Lee, Suwon-si (KR); Soonsuk Seo, Seoul (KR); Chulyong Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 235 days.

(21) Appl. No.: 17/106,913

(22) Filed: Nov. 30, 2020

(65) Prior Publication Data

US 2021/0304642 A1 Sep. 30, 2021

(30) Foreign Application Priority Data

Mar. 24, 2020 (KR) .................. 10-2020-0035875

(51) Int. Cl.
*G06F 1/18* (2006.01)
*G09F 9/30* (2006.01)
(Continued)

(52) U.S. Cl.
CPC ............ *G09F 9/301* (2013.01); *F16M 11/10* (2013.01); *G06F 1/181* (2013.01); *G09F 9/3026* (2013.01);
(Continued)

(58) Field of Classification Search
CPC combination set(s) only.
See application file for complete search history.

(56) References Cited

U.S. PATENT DOCUMENTS 5,900,848 A * 5/1999 Haneda .................. G06F 1/1643
361/679.04
7,334,361 B2 * 2/2008 Schrimpf .............. G09F 9/3026
16/370
(Continued)

FOREIGN PATENT DOCUMENTS

EP 3576172 6/2020
KR 10-2012-0117140 10/2012
(Continued)

OTHER PUBLICATIONS

International Search Report and Written Opinion of the International Searching Authority dated Dec. 15, 2020 in International Patent Application No. PCT/KR2020/011405.

*Primary Examiner* — Lisa Lea-Edmonds
(74) *Attorney, Agent, or Firm* — Staas & Halsey LLP

(57) ABSTRACT

A display apparatus comprises a first plate including a first display panel and a first link member, wherein the first link member includes a first internal link configured to move in a longitudinal direction of the first link member, a second plate including a second display panel and a second link member, wherein the second link member includes a second internal link configured to move in a longitudinal direction of the second link member and a hinge member rotatably connecting the first link member to the second link member to thereby rotatably connect the first display panel to the second display panel, wherein at least of the first internal link and the second internal link include a first opposing link including a first rack, a second opposing link including a second rack facing the first rack, and a pinion gear interlocking the first opposing link and the second opposing link.

17 Claims, 15 Drawing Sheets

(51) Int. Cl.
  *G09F 9/302* (2006.01)
  *F16M 11/10* (2006.01)
(52) U.S. Cl.
  CPC . *F16M 2200/065* (2013.01); *F16M 2200/066* (2013.01)

(56) References Cited

U.S. PATENT DOCUMENTS

| | | | |
|---|---|---|---|
| 7,515,406 B2 | 4/2009 | Kee et al. | |
| 9,071,673 B2 | 6/2015 | Choi et al. | |
| 9,655,267 B2* | 5/2017 | Cope | G09F 9/35 |
| 9,911,369 B2* | 3/2018 | Kim | G09F 9/301 |
| 10,098,246 B1* | 10/2018 | Cope | G09F 9/35 |
| 10,390,443 B2 | 8/2019 | Kim et al. | |
| 10,687,428 B2 | 6/2020 | Kim et al. | |
| 2005/0210722 A1* | 9/2005 | Graef | G09F 9/3026 345/82 |
| 2006/0218828 A1* | 10/2006 | Schrimpf | G09F 9/33 40/574 |
| 2012/0264489 A1 | 10/2012 | Choi et al. | |
| 2016/0353588 A1* | 12/2016 | Kim | G09F 15/0025 |
| 2017/0031386 A1* | 2/2017 | Engel | F16M 11/42 |
| 2017/0255232 A1* | 9/2017 | Ram | G06F 1/1649 |
| 2018/0220537 A1* | 8/2018 | Heo | G06F 3/1446 |
| 2020/0285272 A1* | 9/2020 | Flessas | G09F 9/3026 |
| 2021/0304642 A1* | 9/2021 | Lee | F16M 11/18 |

FOREIGN PATENT DOCUMENTS

| | | |
|---|---|---|
| KR | 10-1400284 | 5/2014 |
| KR | 10-2016-0011140 | 1/2016 |
| KR | 10-1861077 | 6/2018 |
| KR | 10-2019-0054427 | 5/2019 |
| KR | 10-2019-0071119 | 6/2019 |
| KR | 10-2019-0084836 | 7/2019 |
| KR | 10-2019509 | 9/2019 |
| KR | 10-2031910 | 10/2019 |
| KR | 10-2020-0117771 | 10/2020 |
| KR | 10-2021-0054822 | 5/2021 |
| WO | 2012/098473 | 7/2012 |
| WO | 2012/110900 | 8/2012 |

\* cited by examiner

DISPLAY APPARATUS

CROSS-REFERENCE TO RELATED APPLICATION(S)

This application is based on and claims priority under 35 U.S.C. § 119(a) to Korean Patent Application No. 10-2020-0035875, filed on Mar. 24, 2020, in the Korean Intellectual Property Office, the disclosure of which is incorporated by reference herein in its entirety.

BACKGROUND

1. Field

The disclosure relates to a display apparatus. More particularly, the disclosure relates to a display apparatus allowing small forces to be easily unfolded through an improved link structure.

2. Description of the Related Art

Recently, with the development of displays, a screen size of a display apparatus is getting bigger. However, when a display apparatus is not used, its screen meaninglessly occupies a lot of space.

Accordingly, a display apparatus which is folded and unfolded as needed is being developed.

However, a driving device of fairly large size, which can cope with weight of a large screen, is required to unfold or fold the screen of the display apparatus. However, such display apparatus does not have an aesthetical value sufficiently and also inefficiently takes up a lot of space.

SUMMARY

Provided is a display apparatus allowing small forces to be easily unfolded through an improved link structure.

Additional aspects will be set forth in part in the description which follows and, in part, will be apparent from the description, or may be learned by practice of the presented embodiments.

According to an embodiment of the disclosure, a display apparatus includes a first plate including a first display panel and a first link member, wherein the first link member includes a first internal link configured to move in a longitudinal direction of the first link member, a second plate including a second display panel and a second link member, wherein the second link member includes a second internal link configured to move in a longitudinal direction of the second link member and a hinge member rotatably connecting the first link member to the second link member to thereby rotatably connect the first display panel to the second display panel, wherein at least of the first internal link and the second internal link include a first opposing link including a first rack, a second opposing link including a second rack facing the first rack, and a pinion gear interlocking the first opposing link and the second opposing link.

The hinge member includes a first hinge connected to the first internal link, and a second hinge connected to the second internal link.

The first hinge and the second hinge have a common rotation axis, wherein the first hinge includes a first connecting bar connected to the second internal link and the second hinge includes a second connecting bar connected to the first internal link, and wherein a connection of the first connecting bar connected to the first internal link is spaced apart from the common rotation axis.

The first link member further includes side walls disposed on both sides of the first internal link, and wherein the second hinge is connected to the side walls.

Each of the side walls includes a groove, and the first hinge is movably connected to the respective grooves of the sidewalls.

The display apparatus further comprises an auxiliary rail including a fixed member fixed to a side wall of the plurality of sidewalls and a moving member configured to move along the fixed member, wherein the first internal link is connected to the moving member of the auxiliary rail.

The display apparatus further comprises an arm member connected to the first link member and a driving source configured to move the arm member, wherein the arm member includes a first arm including a first end connected to the driving source, and a second arm including a first end rotatably connected to a second end of the first arm and a second end connected to the link member.

The driving source is a linear motor.

The arm member further includes an auxiliary arm connected to the second end of the first arm and the first end of the second arm.

The display apparatus further comprises supporting member disposed between the first link member and the second link member, and configured to support the hinge member and an auxiliary driving source configured to move the supporting member.

The auxiliary driving source is a linear motor, and wherein the auxiliary driving source further includes a rotation bar including a first end rotatably connected to the linear motor and a second end rotatably connected to the supporting member.

Each of the first plate and the second plate include a containing groove, wherein the first link member and the second link member are contained in the containing grooves of the first plate and the second plate, respectively.

Each of the first display panel and the second display panel further includes a plurality of micro LEDs.

The display apparatus further comprises a fixed frame configured to support a rotation axis of at least one of the pinion gear of the first internal link and the pinion gear of the second internal link.

The first link member is configured to be substantially aligned with the second link member when the first display panel and the second display panel are adjoined.

The first plate and the second plate are configured to move from a folded position where the first display panel and the second display panel are separated on opposite sides of the first plate and the second plate, to an unfolded position where the first display panel and the second display panel are adjoined and aligned on a same side of the first plate and the second plate.

The display apparatus is configured such that when the display apparatus moves from the folded position to the unfolded position, a counter-clockwise rotation of the first link member causes the hinge member to push the first opposing links away from the hinge member to rotate the pinion gears and pull the second opposing links toward the hinge member, which causes a clockwise rotation of the second link member to thereby smoothly unfold the display apparatus.

DETAILED DESCRIPTION

Figure 1:
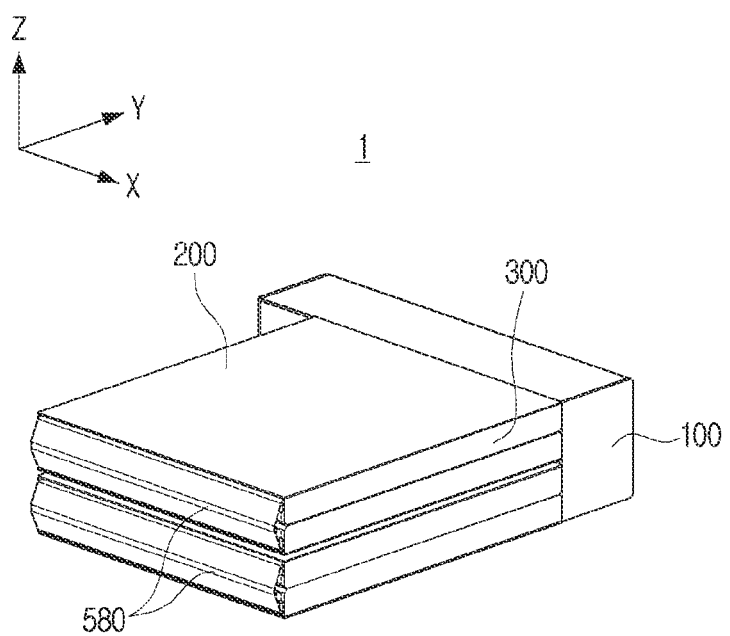
FIGS. 1 to 3 are perspective views illustrating a process of operating a display apparatus according to an embodiment of the disclosure.

In the following description, same drawing reference numerals are used for the same elements even in different drawings. In the following description, well-known functions or constructions are not described in detail since they would obscure the invention in unnecessary detail. Further, dimensions of various elements in the accompanying drawings may be arbitrarily increased or decreased for assisting in a comprehensive understanding.

The terms used in the disclosure and the claims are general terms selected in consideration of the functions of the various example embodiments of the disclosure. However, such terms may be varied depending on an intention of those skilled in the art, a legal or technical interpretation, an emergence of a new technology, and the like. Also, there may be some terms arbitrarily selected by an applicant. Such terms may be construed according to meanings defined in the present specification, and may also be construed based on general contents of the present specification and a typical technical concept in the art unless the terms are not specifically defined.

In the disclosure, the terms "include", "may include, "comprise", "may comprise" or the like designate the presence of features (e.g., numbers, functions, operations, components, elements, or a combination thereof) that are written in the specification, but do not exclude the presence or possibility of addition of one or more other features.

The terms such as "first," "second," and so on may be used to describe a variety of elements, but the elements should not be limited by these terms. The terms are only used to differentiate one component from other components. For example, the 'first' component may be named the 'second' component, and vice versa, without departing from the scope of the disclosure.

The terms such as "front", "rear", "upper surface", "lower surface", "side", "left", "right", "upper part", and "lower part" used in the disclosure are defined based on drawings. However, the shape and position of each component are not limited by the terms.

In the disclosure, components necessary for description of each embodiment of the disclosure are described, and thus are not limited thereto. Accordingly, some components may be changed or omitted, and other components may be added. In addition, they may be distributed and arranged in different independent devices.

Embodiments of the disclosure will be described in detail with reference to the accompanying drawings and the contents described in the accompanying drawings, but the disclosure is not limited by the embodiments.

An object of the disclosure may to address a display apparatus capable of being easily unfolded with small forces through an improved link structure.

Figure 2:
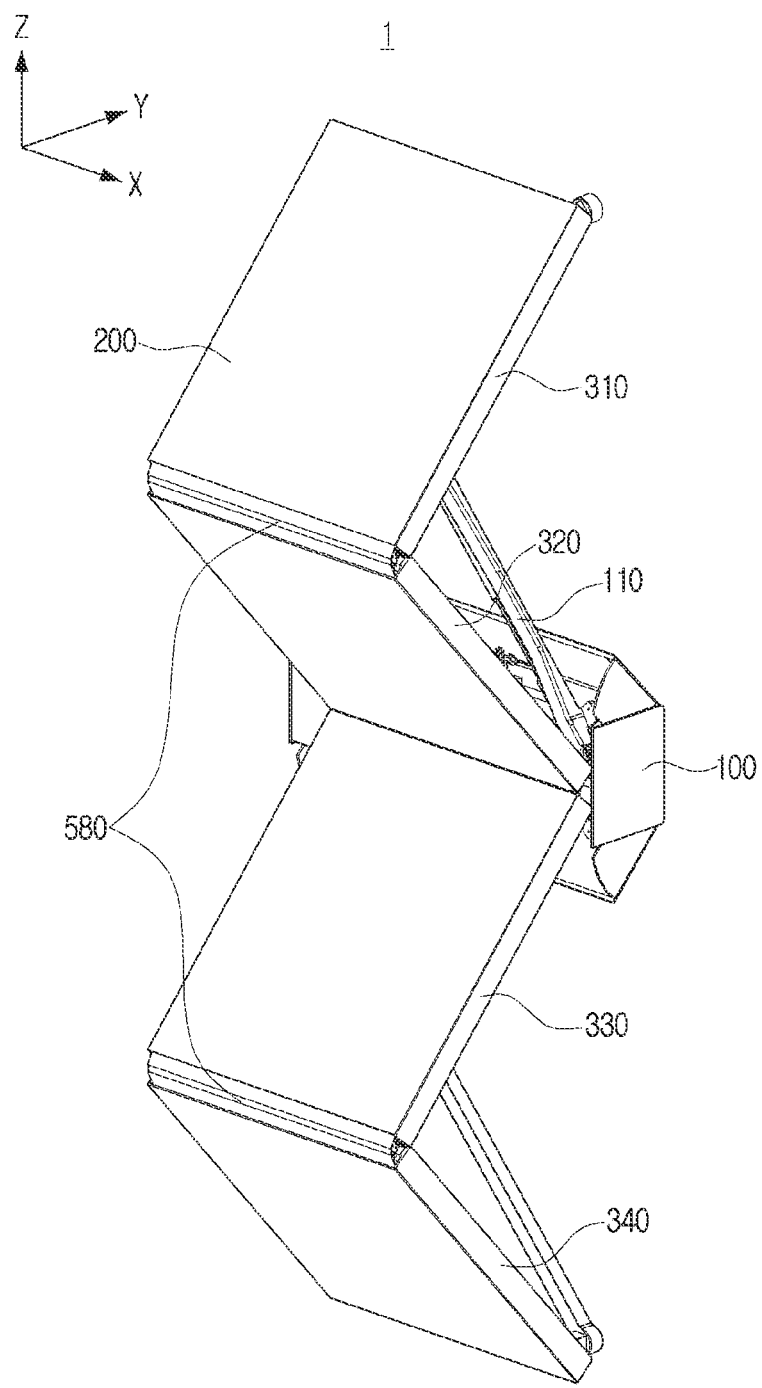
Figure 3:
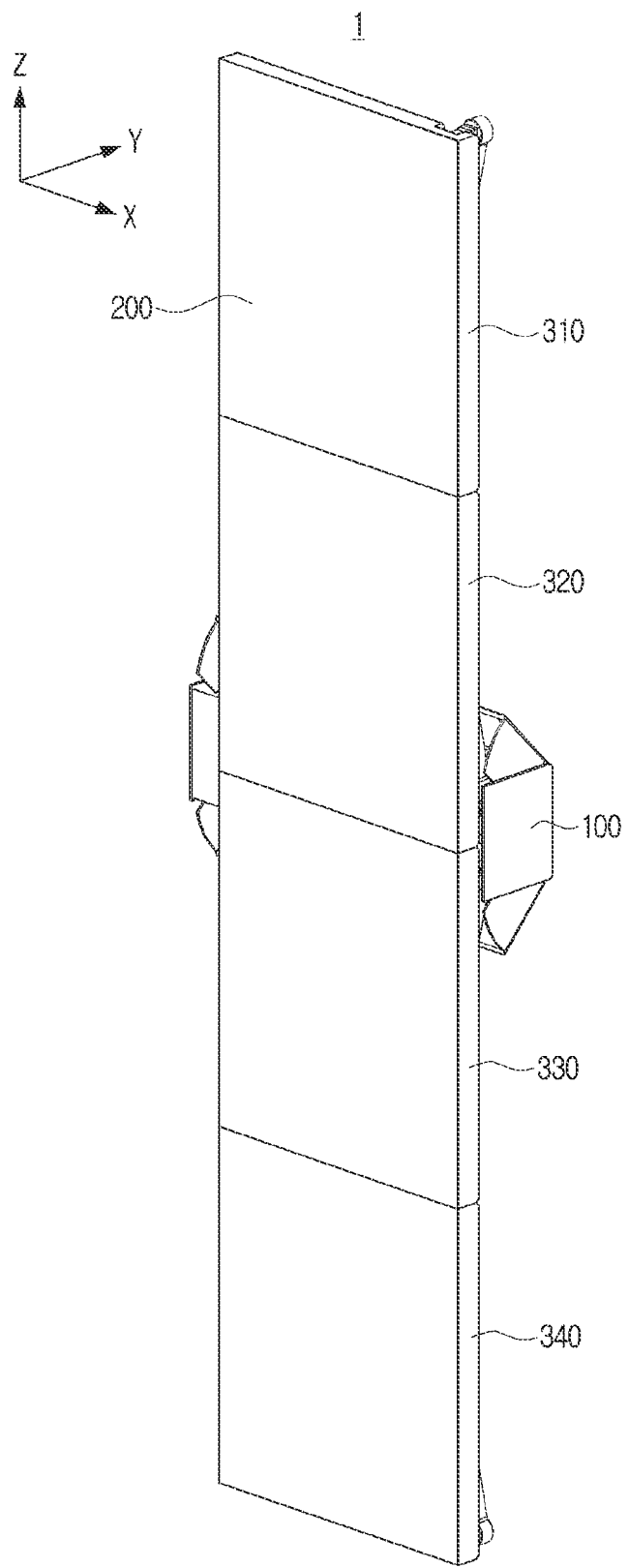

FIGS. 1 to 3 are perspective views illustrating a process of operating a display apparatus 1 according to an embodiment of the disclosure. The views may illustrate a state that the display apparatus 1 is folded, a state that the display apparatus 1 is being unfolded, and a state that the display apparatus 1 is fully unfolded, respectively. Referring to FIGS. 1 to 3, the display apparatus 1 according to an embodiment of the disclosure may include a driving device 310, a display panel 100, and a plate 300.

The display apparatus 1 according to various embodiments of the disclosure may be a part of an electronic apparatus, furniture, or a building/structure including an image display function. For example, the display apparatus 1 may include at least one of a television, a digital video disk (DVD) player, a smartphone, a desktop personal computer (PC), a tablet personal computer (PC), a laptop personal computer (laptop PC), a personal digital assistant (PDA), a portable multimedia player (PMP), a mobile medical device, a camera, and a wearable device.

The driving device 100 may be a device providing power so that the display panel 200 and the plate 300 can be unfolded or folded. The driving device 100 may normally contain the arm member 110 therein, and expose it to the outside during operation to unfold the display panel 200 and the plate 300. The detailed configuration of the driving device 100 and the arm member 110 will be described later.

The driving device 100 is located at the center of a plurality of plates 300, and may push or pull the plates 300. For example, the driving device 100 may push a first plate 310 disposed at the top and a fourth plate 340 disposed at the bottom upward and downward, respectively, so that the plurality of plates 300 are straightened.

The rear of the driving device 100 may be fixed to a wall, or a part thereof may be inserted into the wall, but its position is not limited thereto.

The display panel 200 may display various contents (for example, text, images, videos, icons, symbols, or the like.) to the user. The display panel 200 may include, for example, a liquid crystal display (LCD), a light-emitting diode (LED) display, an organic LED (OLED) display, a micro electro mechanical system (MEMS) display, an electronic paper display, or a flexible display having a display portion that is bent or flexed.

The display panel 200 may be disposed on one surface of the plate 300 and be unfolded or folded together with the plate 300. As illustrated, the display panel 200 may be formed in plural, and a plurality of display panels 200 may be separately disposed on the first to fourth plates 310, 320, 330, and 340, respectively.

In other words, the display panel 200 may be normally separated, but when the display apparatus 1 is fully unfolded, the plurality of display panels 200 may be connected to each other to form a single screen.

The display panel 200 may include a plurality of micro LEDs, and accordingly, when the display apparatus 1 is completely unfolded, a continuous image that is not broken at a boundary to which the plurality of display panels 200 are connected may be output. Accordingly, the user may watch a large screen that naturally outputs an image without undulating ripples even at the boundary where the display panels 200 are connected.

The plate 300 may have a substantially rectangular parallelepiped shape, and the display panel 200 may be disposed on one surface. The plate 300 may be unfolded or folded by receiving power from the driving device 100.

The plate 300 may be plural, and may be disposed vertically. The plate 300 may be vertically formed of the first to fourth plates 310, 320, 330, and 340 in order, but the arrangement and number are not limited thereto, and may be horizontally arranged.

The first to fourth plates 310, 320, 330, and 340 may usually have a stacked structure, and may be unfolded in a shape of approximately 'W' by the driving device 100, and finally unfolded in a straight line.

The plate 300 may include a driving circuit that transmits image data to be output therein to the display panel 200.

Figure 4:
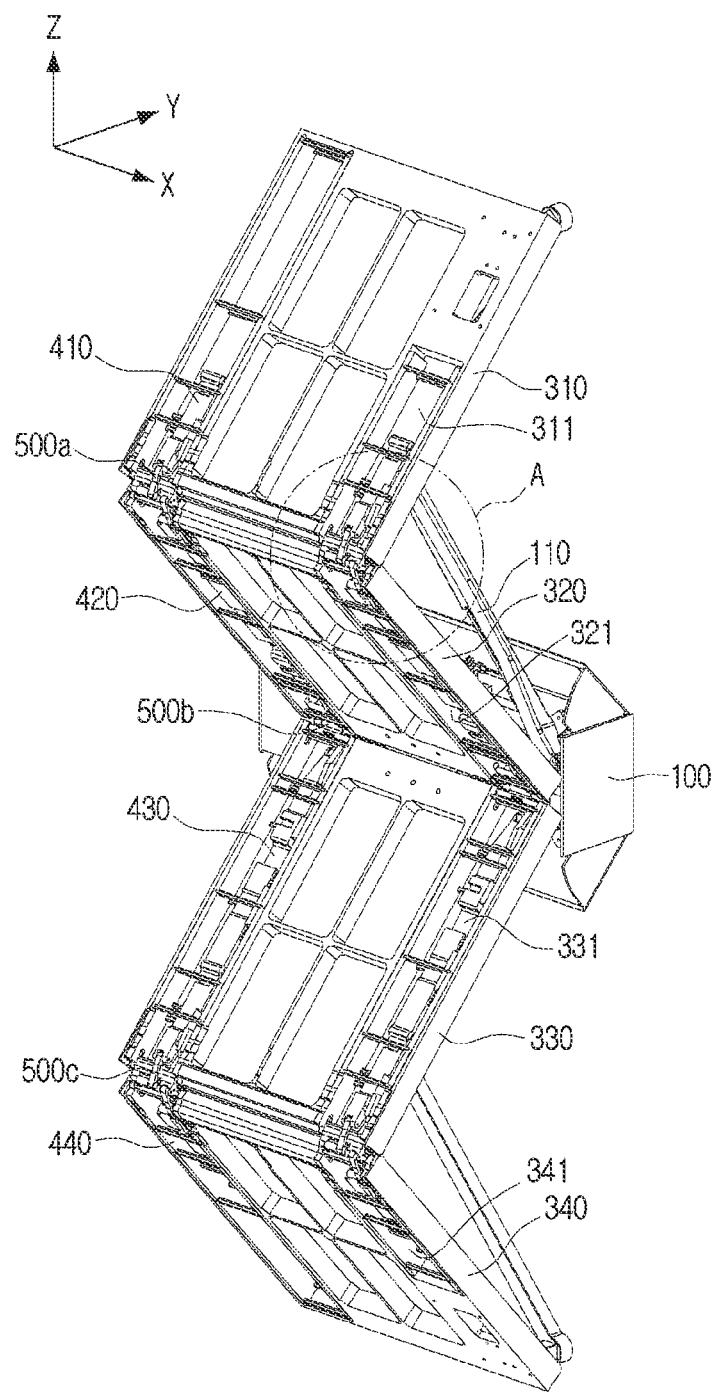
FIG. 4 is a perspective view illustrating a display apparatus without a display panel and a hinge cover of a display apparatus of FIG. 2.

A hinge cover 580 that covers hinge members 500 of FIG. 4 may be disposed between the first and second plates 310 and 320 and between the third and fourth plates 330 and 340. The hinge cover 580 may normally cover the hinge members 500 so that the hinge members 500 are not exposed to the outside, and may be contained in the plate 300 together with the hinge members 500, when the display apparatus 1 is fully unfolded. Accordingly, cleaning of the display apparatus 1 may be facilitated.

FIG. 4 is a perspective view illustrating a display apparatus without the display panel 200 and the hinge cover 580 of the display apparatus of FIG. 2.

The display apparatus 1 according to an embodiment of the disclosure may include a plurality of link members 400 and hinge members 500 that connect between the plurality of link members 400 to be rotated.

The plurality of link members 400 may include first to fourth link members 410, 420, 430, and 440. Also, the first to fourth link members 410, 420, 430, and 440 may be contained in grooves for containing 311, 321, 331, and 341 formed in the first to fourth plates 310, 320, 330, and 340, respectively. However, the number of the plurality of link members 400 is not limited thereto.

The plurality of link members 400 may be rotated in the same direction as the plate 300 each of them are contained, and may be disposed in pairs on both edges of the plate 300. As illustrated in detail, the plurality of link members 400 may be disposed on both edges of each of the first to fourth plates 310, 320, 330, and 340, and may be formed in a total of eight.

The hinge member 500 may be formed in plural and disposed between the plurality of link members 400. For example, the first to third hinge members 500A, 500B, and 500C may be respectively disposed between the first and second link members 410, 420, between the second and third link members 420, 430, and the third and fourth link members 430 and 440 and the hinge member 500 may connect the spaces between the plurality of link members 400 to be rotated.

The hinge members 500 may be normally exposed between the plurality of plates 300, and may not be exposed by being contained the plurality of plates 300 when the display apparatus 1 is fully unfolded. Accordingly, cleaning of the display apparatus 1 may be facilitated.

Hereinafter, the detailed shape and operation process of the link members 400 and the hinge members 500 will be described later in greater detail below.

Figure 5:
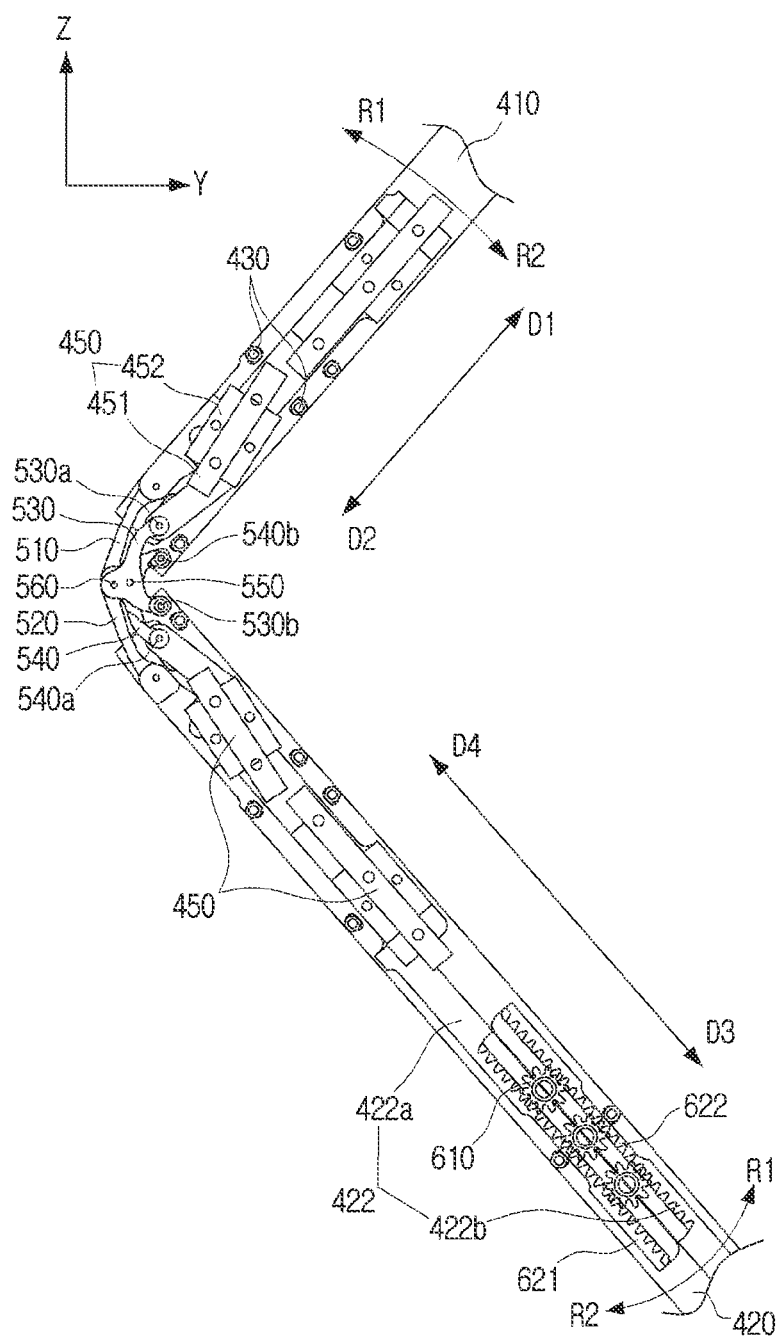
FIGS. 5 to 6 are a side view and a perspective view, respectively, illustrating an enlarged A part of FIG. 4.
Figure 6:
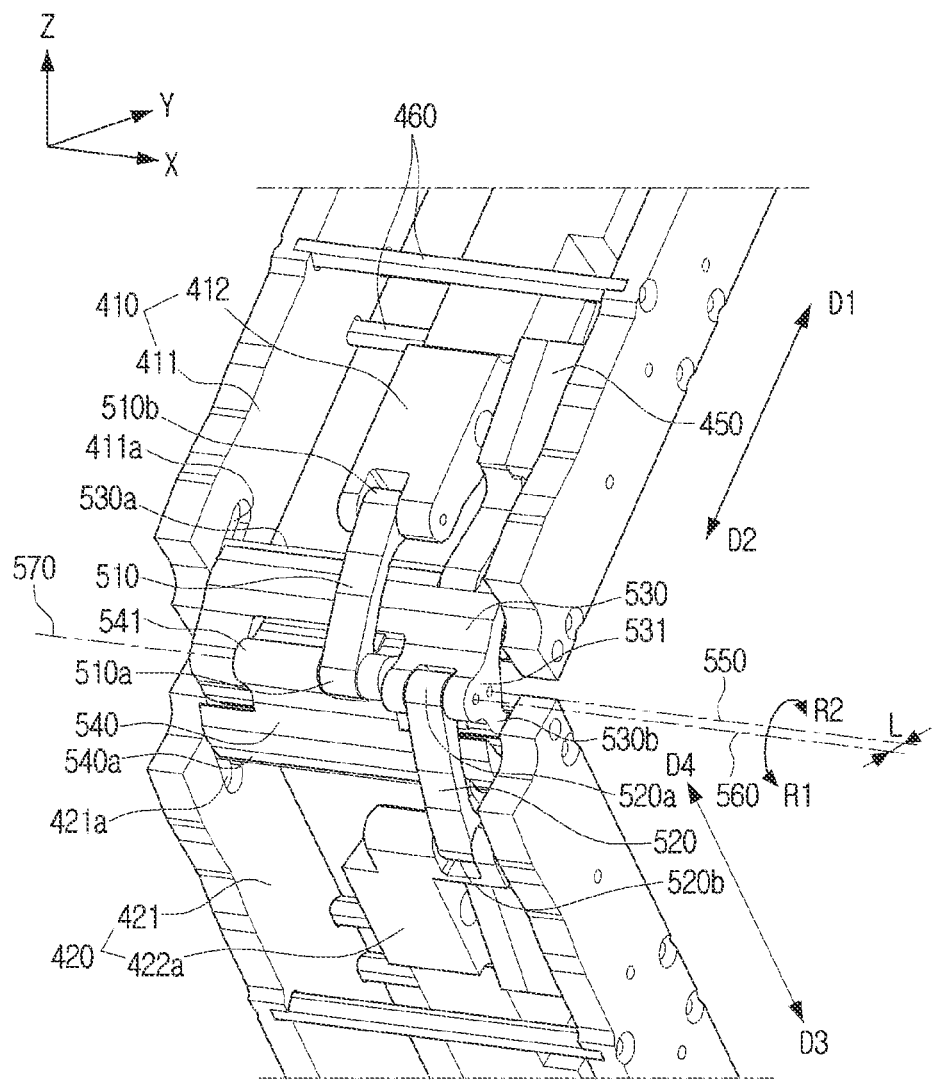
Figure 7:
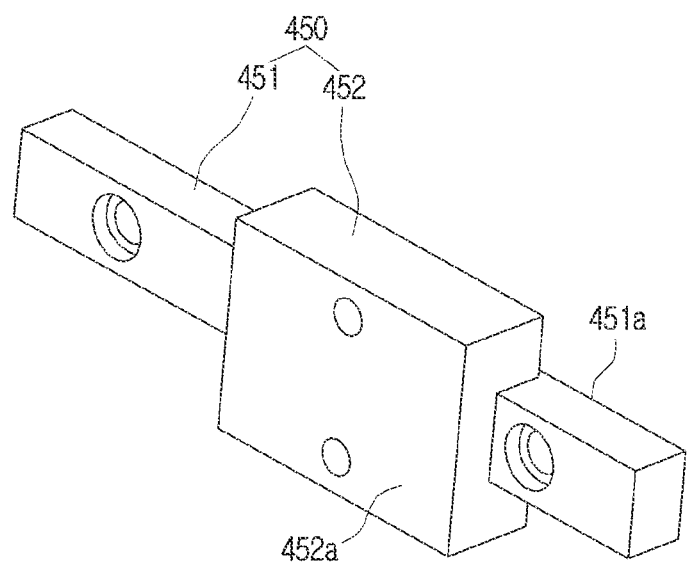
FIG. 7 illustrates a perspective view of a rail according to an embodiment of the disclosure.
Figure 8:
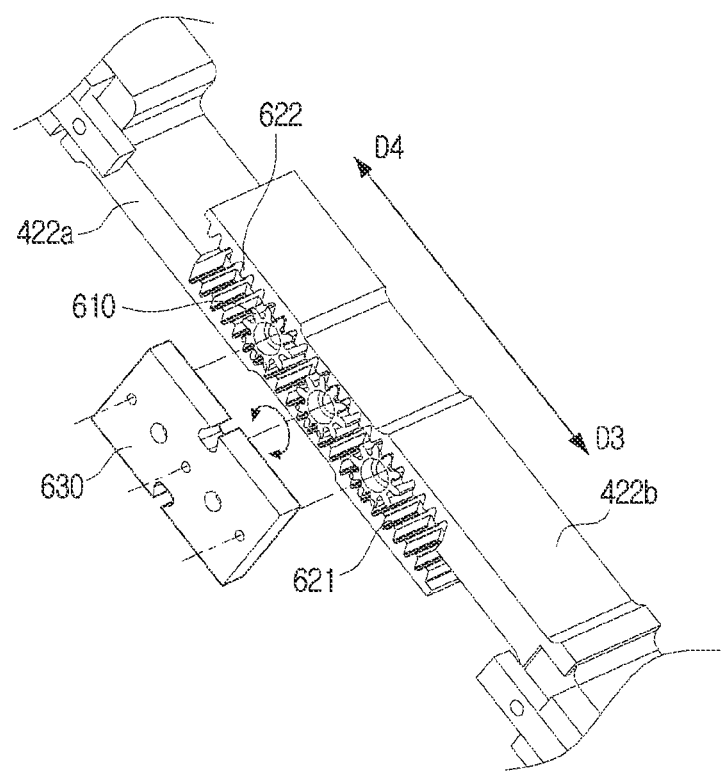
FIG. 8 illustrates an exploded perspective view of a rack and pinion gear structure disposed on an inner link.

FIGS. 5 to 6 are a side view and a perspective view, respectively, illustrating an enlarged A of FIG. 4, FIG. 7 illustrates a perspective view of a rail according to an embodiment of the disclosure, and FIG. 8 illustrates an exploded perspective view of a rack and pinion gear structure disposed on an inner link.

The plurality of link members 400 may have a symmetrical structure based on the driving device 100. For example, the structure of the first link member may be the same as that of the fourth link member, and the structure of the second link member may be the same as that of the third link member. Hereinafter, the structures of the first and second link members 410 and 420 will be mainly described for convenience of description.

Referring to FIGS. 5 to 6, the first and second link members 410 and 420 according to an embodiment of the disclosure may include first and second sidewalls 411 and 421, respectively, and first and second internal links 412 and 422, respectively.

The first and second internal links 412 and 422 may move in the longitudinal direction of the first and second link members 410 and 420, respectively. For example, the first internal link 412 may move in D1 and D2 directions, and the second internal link 422 may move in D3 and D4 directions.

The first and second sidewalls 411 and 421 may be disposed on both sides of the first and second internal links 412 and 422, respectively, and one surface may be fixed to the first and second plates 310 and 320.

An auxiliary rail 450 may be disposed on the first and second sidewalls 411 and 421. The auxiliary rail 450 may be formed in plural along the longitudinal direction of the plurality of link members 400.

Referring to FIG. 7, the auxiliary rail 450 may include a fixed member 451 and a moving member 452. The fixed member 451 may be fixed to the first and second side walls 411 and 421, and the moving member 452 may move along the fixed member 451 in a state where one region is in contact with the fixed member 451.

A rear surface 451A of the fixed member 451 may be fixed to the first and second side walls 411, 421, and a front surface 452A of the moving member 452 may be connected to one area of the first and second internal links 412, 422. Accordingly, the auxiliary rail 450 may guide moving directions of the first and second internal links 412 and 422, and the first and second internal links 412 and 422 may easily move along the rail 450 in the longitudinal direction of the first and second side walls 411 and 421.

The first and second sidewalls 411 and 421 disposed on both sides of the first and second internal links 412 and 422 may be connected by a connecting member 460. The connecting member 460 may be formed in plural along the longitudinal direction of the first and second sidewalls 411 and 421, stably support the first and second sidewalls 411 and 421, and prevent the first and second internal links 412 and 422 from being detached.

Referring to FIG. 8, the second internal link 422 may include first and second opposing links 422A and 422B facing each other. The first and second opposing links 422A and 422B may be formed with racks 621 and 622 on opposite surfaces, respectively, and pinion gears may be interlocked between the racks 621 and 622.

For example, when the display apparatus 1 is unfolded, the first and second link members 410 and 420 may rotate in R1 and R2 directions, respectively, and a first hinge member 500A that connects the first and second link members 410 and 420 may push the first internal link 412 and the first opposing link 422A in D1 and D3 directions, respectively.

Accordingly, when the first opposing link 422A moves in the D3 direction, the pinion gear may rotate counterclockwise, and an interlocked second opposing link 422B may move in the D4 direction.

Accordingly, a force that the first hinge member 500A pushes the first opposing link 422A in the D3 direction may be converted to a force that the second opposing link 422B pulls the second hinge member 500B in the D4 direction. In other words, since the second hinge member 500B is unfolded under the force of pulling in the D4 direction, the second and third link members 420 and 430 may be easily unfolded.

In other words, as the display apparatus 1 according to an embodiment of the disclosure is provided with the above-described link structure, power may be transmitted from one hinge member 500 to another hinge member 500.

Figure 9:
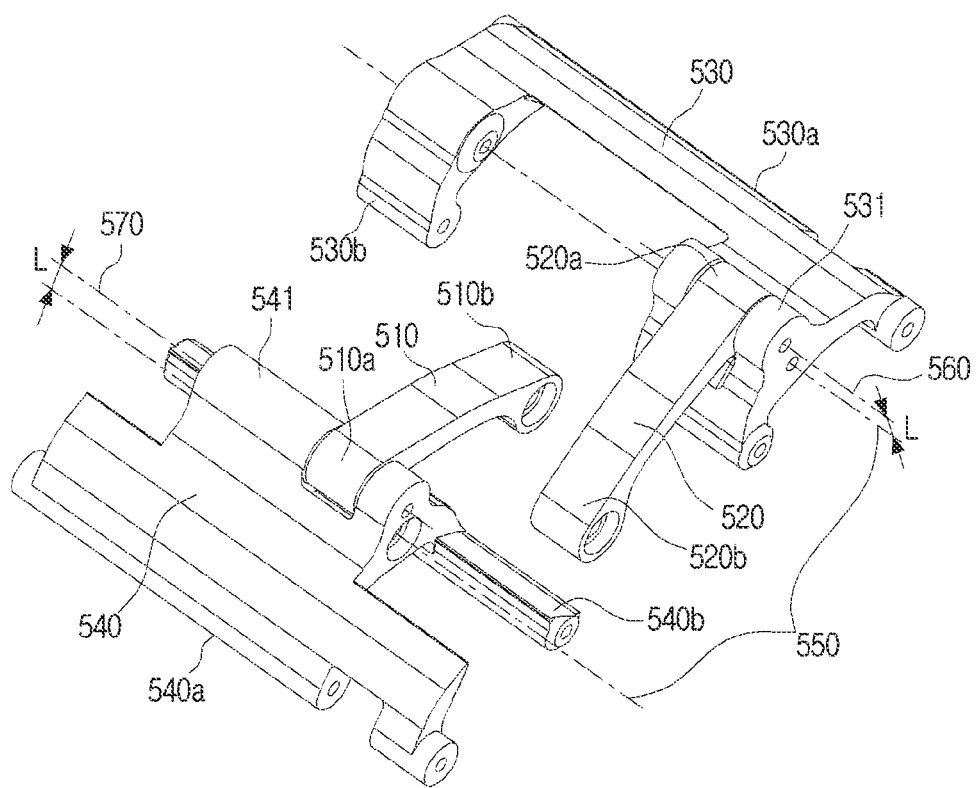
FIG. 9 illustrates an exploded perspective view of a hinge member according to an embodiment of the disclosure.

FIG. 9 illustrates an exploded perspective view of a hinge member according to an embodiment of the disclosure. The hinge member 500 may include first and second connecting bars 510 and 520 and first and second hinges 530 and 540.

The first and second hinges 530 and 540 may have the same rotation axis 550. However, the first and second hinges 530 and 540 do not necessarily rotate in the same direction, and may independently and freely rotate on the rotation axis 550.

The first and second hinges 530 and 540 may have one end 530A and 540A connected to the first internal link 412 and the first opposing link 422A, respectively. Further, the other ends 530B and 540B of the first and second hinges 530 and 540 may be fixed to the first and second sidewalls 411 and 421, respectively.

The one end 530A and 540A of the first and second hinges 530 and 540 may be located farther than the other end 530B and 540B based on the rotation axis 550.

The first and second sidewalls 411 and 421 may have first and second grooves 411A and 421A, respectively, in the path through which the ends 530A and 540A of the first and second hinges 530 and 540 move. One end 530A and one end 540B of the first and second hinges 530 and 540 may move along the first and second grooves 411A, 421A, respectively.

When the display apparatus 1 is unfolded, the other end 530B of the first hinge 530 moves together with a point of the second side wall 421 rotating in the R1 direction around the rotation axis 550, so that the first hinge 530 may rotate in the R1 direction around the rotation axis 550. Accordingly, one end 530A of the first hinge 530 may move in the D1 direction along the first groove 411A, and the first internal link 412 connected to one end 530A of the first hinge 530 may move in the D1 direction.

The other end 540B of the second hinge 540 moves together with a point of the first sidewall 411 rotating in the R2 direction around the rotating axis 550, such that the second hinge 540 may rotate in the R2 direction around the rotation axis 550. Accordingly, one end 540A of the second hinge 540 may move in the D3 direction along the second groove 421A, and the first opposing link 422A connected to one end 540A of the second hinge 540 may also move in the D3 direction.

When the display apparatus 1 is unfolded, the first hinge member 500A may push the first internal link 412 and the first opposing link 422A to move in the D1 and D3 directions, respectively. On the other hand, when the display apparatus 1 is folded, the first hinge member 500A may pull the first internal link 412 and the first opposing link 422A to move in the D2 and D4 directions, respectively.

In other words, the hinge member 500 may push an internal link adjacent when the display apparatus 1 is unfolded, and pull the link when the display apparatus 1 is folded.

The first connecting bar 510 may have one end 510A connected to one region 541 of the second hinge 540 on the second connection axis 570, and the second connecting bar 520 may have one end 520A connected to one region 531 of the first hinge 530 on the first connection axis 560.

The first and second connection axes 560 and 570 may be located at a distance from the rotation axis 550 of the hinge member 500 by a predetermined distance L. Also, the other ends 510B and 520B of the first and second connecting bars 510 and 520 may be connected to the first opposing link 422A and the first internal link 412, respectively.

When the display apparatus 1 is unfolded, the first connecting bar 510 may move in the D1 direction by the second hinge 540 rotating in the R2 direction, and accordingly, the first internal link 412 connected to the other end 510B of the first connecting bar 510 may receive power of the D1 direction.

Also, the second connecting bar 520 may move in the D3 direction by the first hinge 530 rotating in the R1 direction, and thus the first opposing link 422A connected to the other end 520B of the second connecting bar 520 may receive power of the D3 direction.

The distance of movement and the magnitude of the received power of the first and second connecting bars 510 and 520 may be in proportion to the distance L having spacing between the rotating axis 550 of the hinge member 500 and the first and second connection axes 560 and 570.

As the first and second connecting bars 510 and 520 push or pull the first internal link 412 and the first opposing link 422A at the location spaced apart from the rotation axis 550 of the hinge member 500, power may be more efficiently transmitted from one hinge member 500 to the other hinge member 500.

Figure 10:
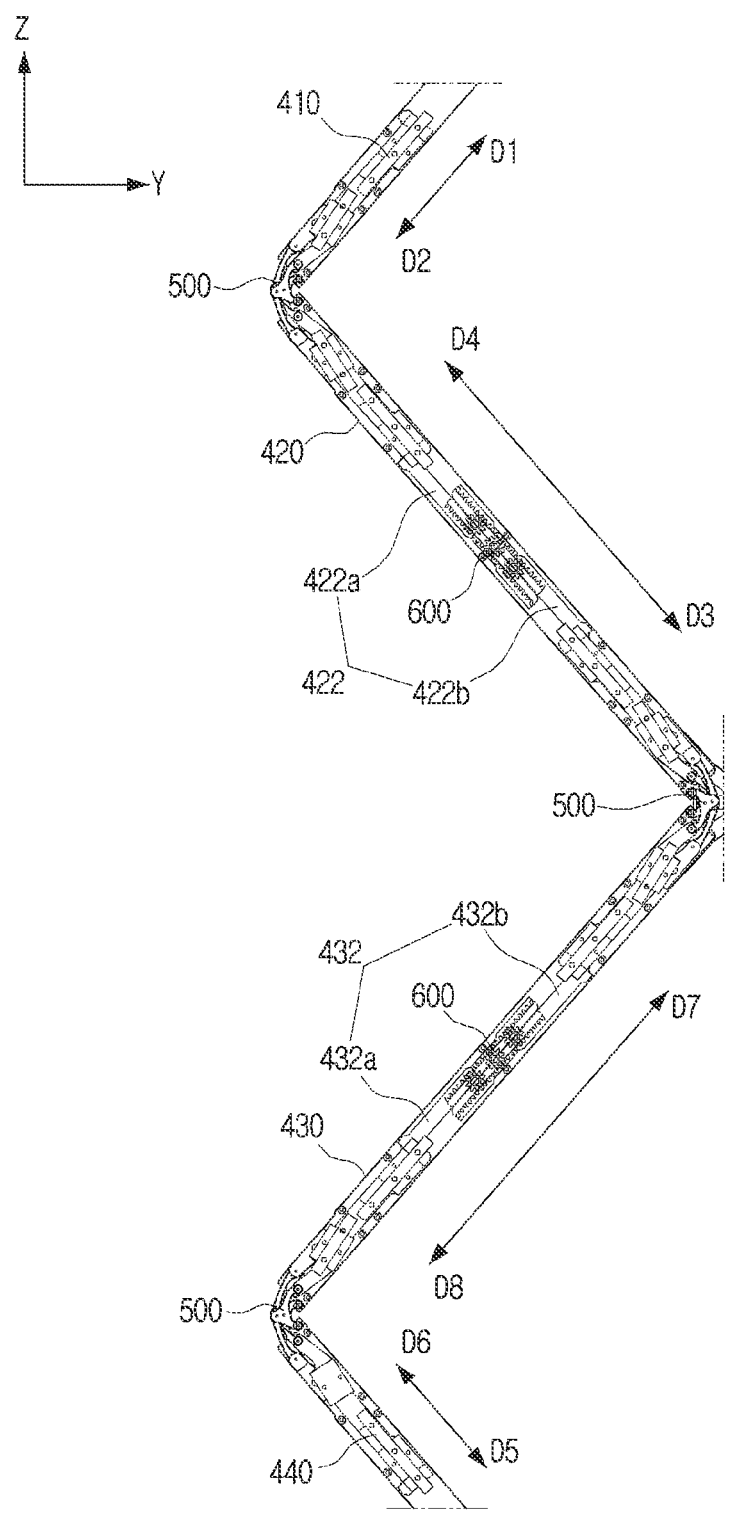
FIG. 10 illustrates a side view of power a power transmission process of a display apparatus according to an embodiment of the disclosure.

FIG. 10 illustrates a side view of power a power transmission process of a display apparatus according to an embodiment of the disclosure.

When the first and fourth link members 410 and 440 receive force from the driving device 100 to the upper side and the lower side, respectively, the plurality of link members 400 may be unfolded simultaneously. At this time, the hinge member 500 may push adjacent inner links connected by the hinge member 500 as described above. For example, the first hinge member 500A may push the first inner link 412 and the first opposing link 422A in D1 and D3 directions, respectively, the second hinge member 500B may push the second opposing link 422B and the fourth opposing link 432B in D4 and D8 directions, respectively, and the third hinge member 500C may push the third opposing link and fourth inner link 441 in D7 and D5 directions, respectively. The plurality of link members 400 may move simultaneously.

As a rack-pinion structure 600 described above is disposed between the first and second opposing links 422A and 422B and between the third and fourth opposing links 432A and 432B, the first opposing link to the fourth opposing link 422A, 422B, 432A, and 432B may transmit power in the above-described movement direction to each other.

For example, when the display apparatus 1 is unfolded, a force that the first hinge member 500A pushes the first opposing link 422A in the D3 direction may be switched to a force that the second opposing link 422B is pulled in the D4 direction by the rack-pinion structure 600. Accordingly, the second hinge member 500B connected to the second opposing link 422B may receive an extended power in the D4 direction.

In other words, as the rack-pinion structure 600 switches the direction of the power, the plurality of link members 400 may transmit and receive power organically to each other.

Accordingly, since each of the hinge members 500A, 500B, and 500C is unfolded or folded at the same speed, the plurality of link members 400 may smoothly perform a symmetrical motion based on its center.

When the plurality of link members 400 are vertically unfolded, the third and fourth link members 430 and 440 may be easily unfolded by gravity as well as power transmitted from the driving device 100. On the other hand, since the first and second link members 410 and 420 are unfolded in the opposite direction of gravity, the unfolding motion may not be relatively easy.

However, since power is organically transmitted to the link members 400 having the above-described structure, the first and second link members 410 and 420 may receive gravity applied to the third and fourth link members 430 and 440, and may be easily unfolded using the gravity as power.

Even when the plurality of link members 400 are folded, contrary to the operation described above, the third and fourth link members 430 and 440 may receive gravity applied to the first and second link members 410 and 420, and may be easily folded using it as a power source.

Accordingly, the display apparatus 1 according to an embodiment of the disclosure may reversely use gravity that may interfere with the operation of the plurality of link members 400 to perform an operation of unfolding or folding more efficiently.

Figure 11:
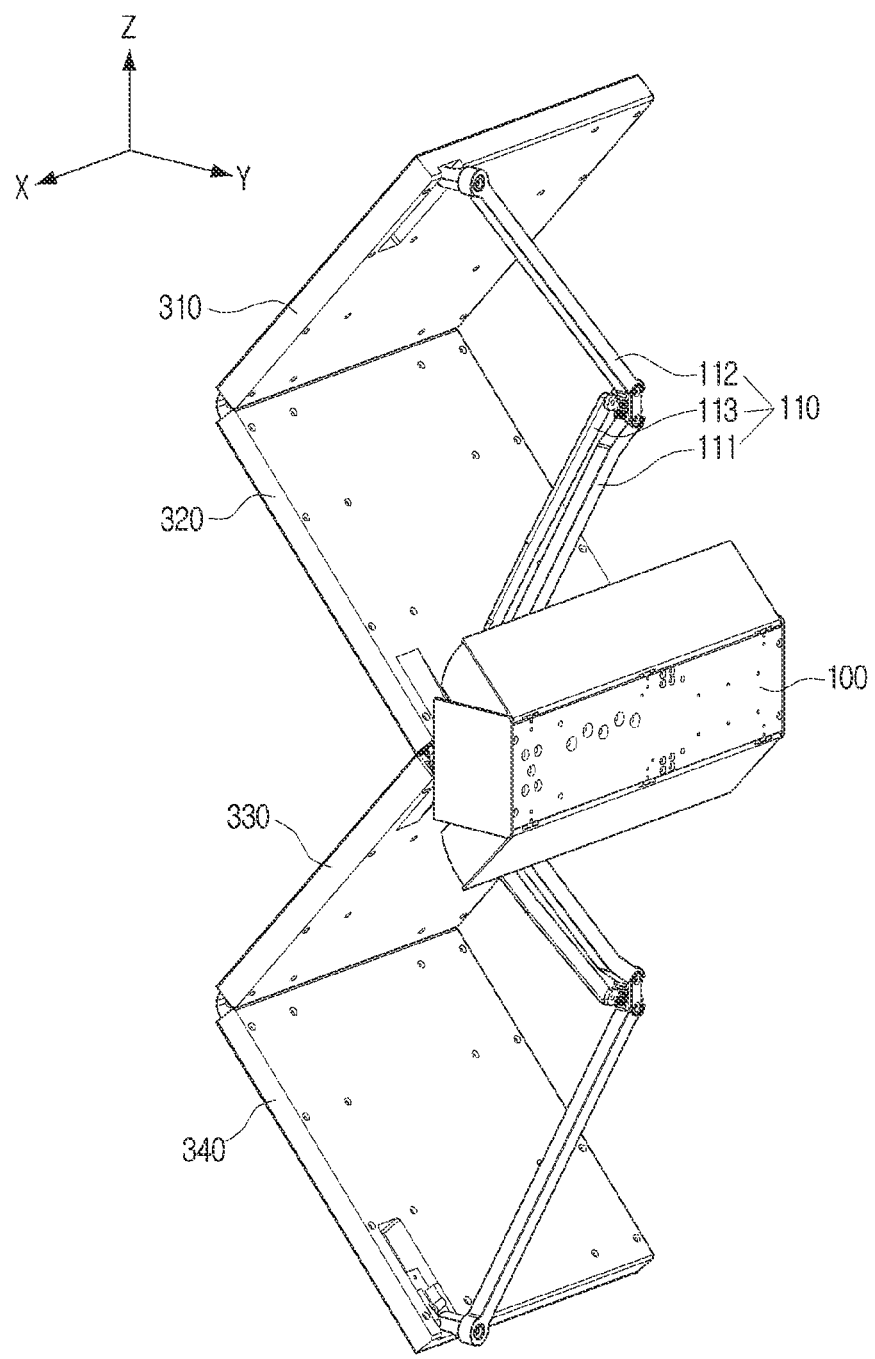
FIG. 11 illustrates a perspective view of a display apparatus as viewed from the rear according to an embodiment of the disclosure.
Figure 12:
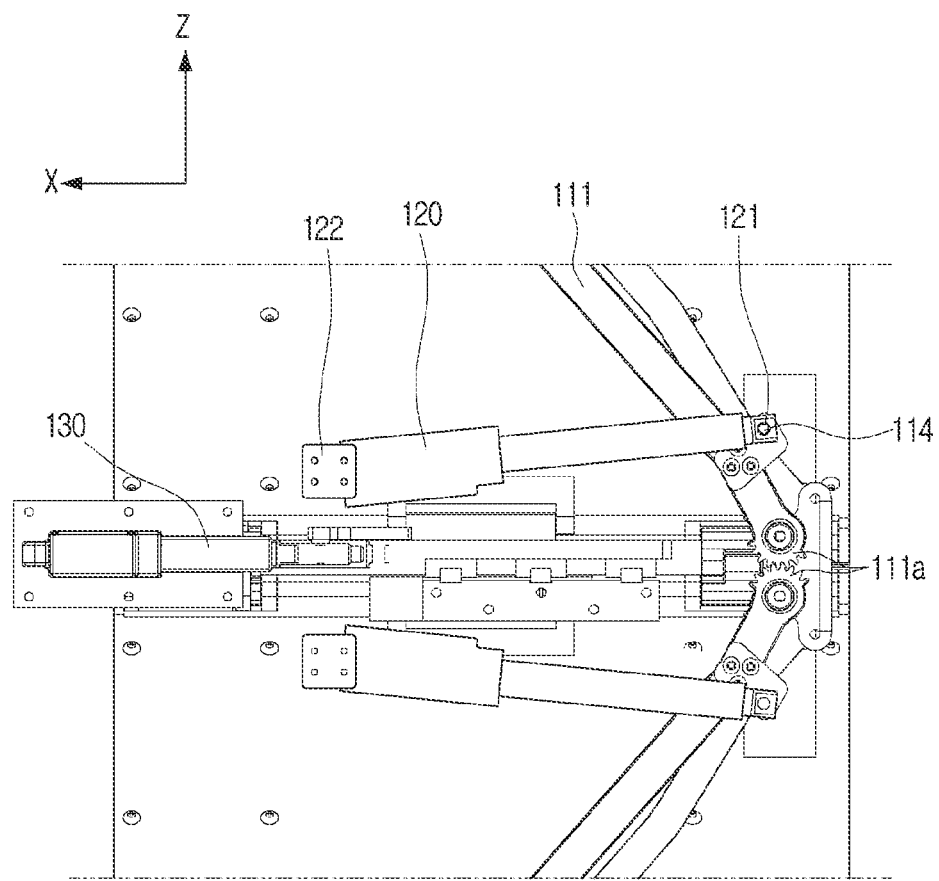
FIGS. 12 and 13 illustrate rear views of a driving device and arm member.
Figure 13:
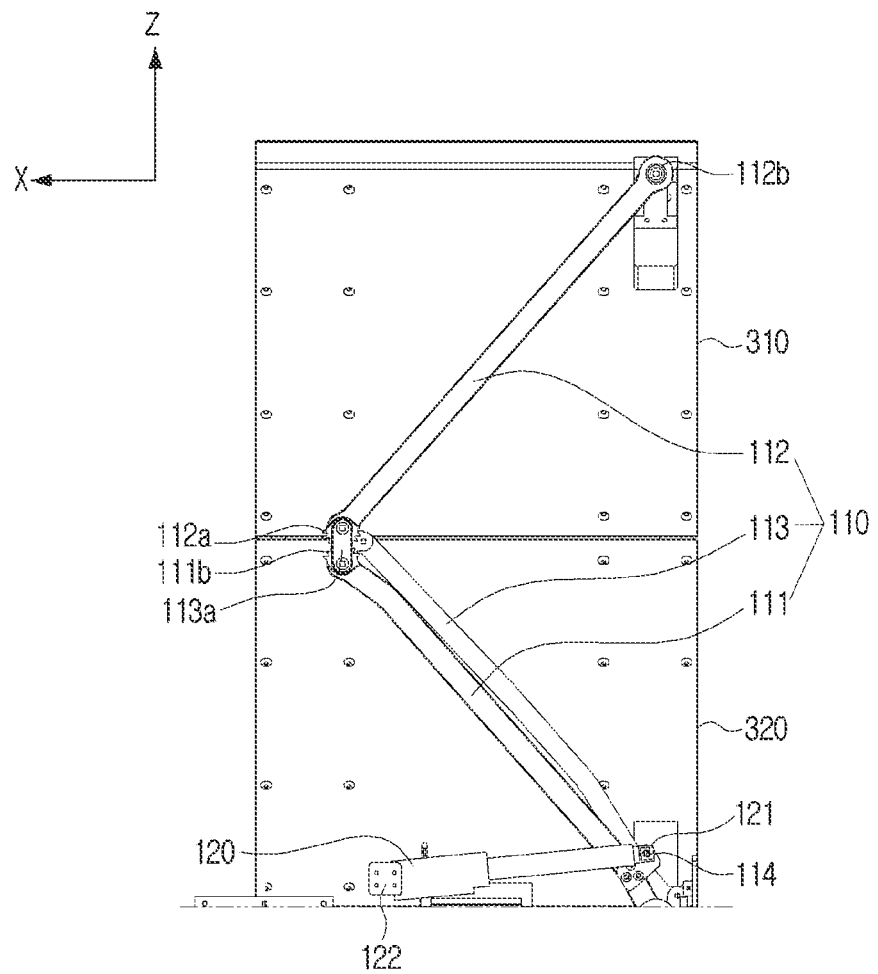
Figure 14:
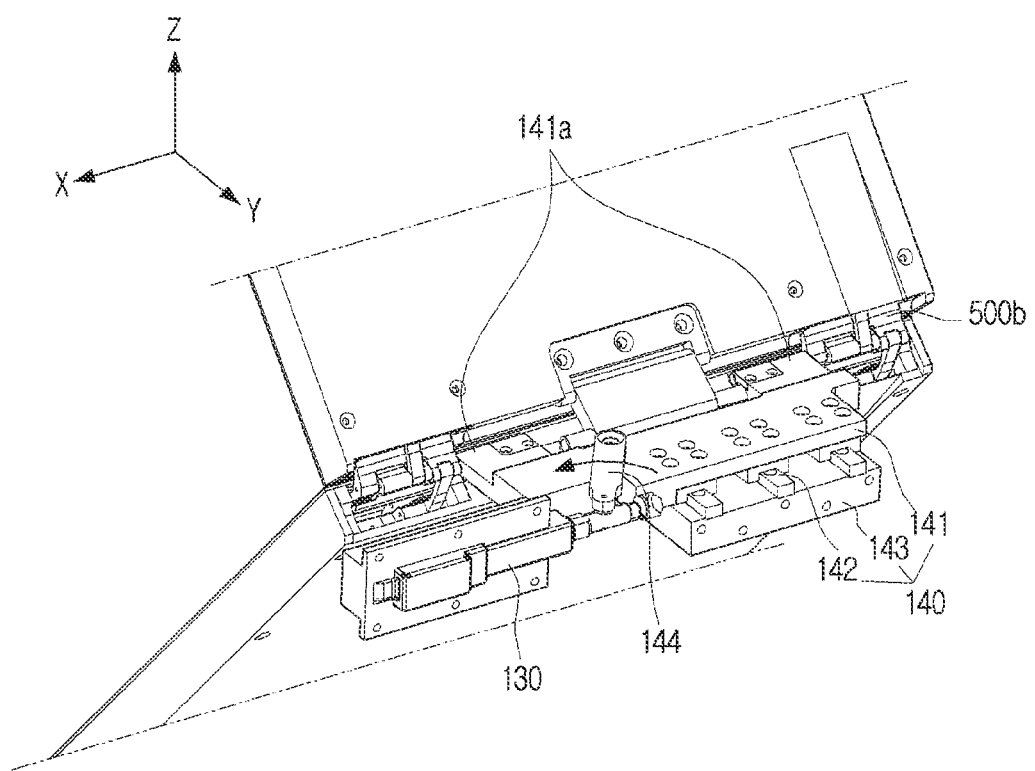
FIG. 14 illustrates a perspective view of a supporting member as viewed from the rear.

FIG. 11 illustrates a perspective view of a display apparatus as viewed from the rear according to an embodiment of the disclosure. FIGS. 12 and 13 illustrate rear views of a driving device and arm member. FIG. 14 illustrates a perspective view of a supporting member as viewed from the rear.

The driving device 100 may include the arm member 110, a driving source 120, an auxiliary driving source 130, and a supporting member 140.

The arm member 110 may be connected to the plurality of link members 400 to transmit power of the driving device 100 to the plurality of link members 400, and when the display apparatus 1 is fully unfolded, the arm member 100 may support the plurality of link members 400 to maintain the unfolded state.

The arm member 110 may be formed as a pair having the same structure on an upper side and a lower side based on the driving device 100, and for convenience of description, the arm member 110 disposed on the upper side of the driving device 100 will be described below.

The arm member 110 may include a first arm 111 and a second arm 112. One end 111A of the first arm 111 may be connected to the driving source 120 and the other end 111B may be rotatably connected to one end 112A of the second arm 112. The other end 112B of the second arm 112 may support a first plate 410.

Gears meshing together may be formed at the other end 111B of the first arm 111 and the one end 112A of the second arm 112, and accordingly, the first and second arms 111 and 112 may rotate at the same angular velocity. For example, the first arm 111 may be rotated by the driving source 120, and the second arm 112 may be passively rotated in the opposite direction from the first arm 111 according to structures of gears.

When the first arm 111 rotates in one direction, the second arm 112 rotates in the opposite direction at the same angular velocity, so that the first plate 310 connected to the other end 112B of the second arm 112 may receive power in a vertically upward direction (Z-axis direction).

The arm member 110 may further include an auxiliary arm 113. One end of the auxiliary arm 113 may be rotatably connected to the driving device 100, and may be arranged side by side with the first arm 111.

The auxiliary arm 113 may include a connection frame 113A supporting the other end 111B of the first arm 111 and one end 112A of the second arm 112, and the connection frame 113A may have a vertical (parallel to the Z-axis) shape without being inclined.

Accordingly, the other end 111B of the first arm 111 and the one end 112A of the second arm 112 may always be arranged perpendicular to each other (parallel to the Z-axis), so the first and second arms 111 and 112 may be stably rotated without deviating from each other, and transmit power in a vertically upward direction (Z-axis direction) to a region of the first plate 310.

The driving source 120 may be connected to the first arm 111 to rotate the first arm 111. The driving source 120 may be a linear motor, but the type of the driving source 120 is not limited thereto, and may also be a rotational motor.

The driving source 120 may be a linear motor in which one end 122 is rotatably connected to the driving device 100 and the other end 121 is connected to the first arm 111. For example, the other end 121 of the driving source 120 may have a hole, the first arm 111 is formed with a projection 114 at a location adjacent to one end 111A, and the projection 114 may be fitted into the hole.

When the driving source 120 is extended, one end 111A of the first arm 111 may be pushed and be rotated in a clockwise direction as a whole, and when contracting, one end 111A of the first arm 111 may be, reversely, pulled and be rotated in a counterclockwise direction as a whole. In other words, a straight line motion of the linear motor may be converted to a rotational motion of the arm member 110.

When the driving source 120 is the linear motor, a size of the entire driving device 100 may be smaller than that of a rotating motor. For example, since the linear motor may be disposed in a direction substantially parallel to the X axis, the driving device 100 may have a slim exterior.

It is illustrated that there are two driving sources 120 in correspondence with the upper and lower arm members 110, but since the one end 111A of the upper and lower first arms are connected to each other while the gears are engaged (refer to FIG. 12), even if only one driving source 120 is provided, the arm member 110 may operate normally.

The supporting member 140 may be disposed at the center of the plurality of link members 400 to support the second hinge member 500B, and the auxiliary driving source 130 may move the supporting member 140 toward the front.

The supporting member 140 may be disposed horizontally (parallel to the Y-axis), and may include a moving block 141, a rail 142, a fixed block 143, and a rotating bar 144.

The fixed block 143 may be fixed to the driving device 100, and the moving block 141 may be connected to the fixed block 143 through the rail 142 to move in a horizontal direction relative to the fixed block 143. In addition, one end 141A of the moving block 141 may be connected to a rotation axis of the second hinge member 500B.

One end and the other end of the rotation bar 144 may be rotatably connected to the auxiliary driving source 130 and the moving block 141, respectively.

When the display apparatus 1 is unfolded, the auxiliary driving source 130 may rotate the rotating bar 144 in a counterclockwise direction. Accordingly, the moving block 141 may move forward, and the rotation axis of the second hinge member 500B may also be moved forward.

In other words, the auxiliary driving source 130 and the supporting member 140 may push the rotation axis of the second hinge member 500B until the plurality of link members 400 are perpendicularly unfolded. Accordingly, viewers may watch a completely flat display panel 200 which is perpendicularly arranged.

Meanwhile, the auxiliary driving source 130 may be a linear motor as the driving source 120.

Figure 15:
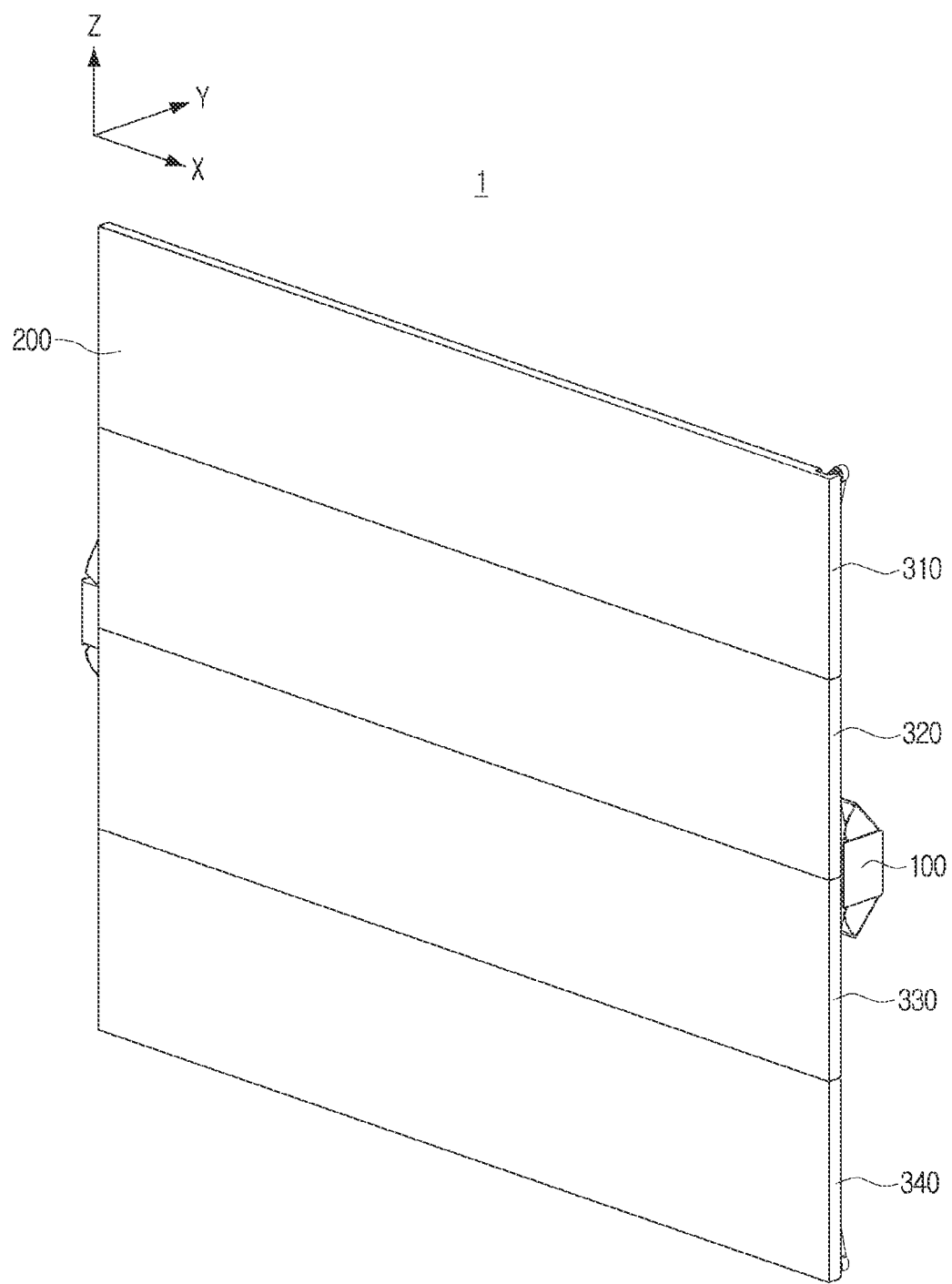
FIG. 15 illustrates a perspective view of a display apparatus according to another embodiment of the disclosure.

FIG. 15 illustrates a perspective view of a display apparatus according to another embodiment of the disclosure.

As illustrated, the display apparatus 1 may be vertically extended to implement various sizes of screens. In this case, the display apparatus 1 may form the arm member 110 or the driving source 120 in plural to support the plate 300 more stably.

Meanwhile, even when the display apparatus 1 is vertically extended, according to the structures of the hinge and link, the display apparatus 1 may be unfolded or folded by small forces, and a slim and compact driving device 100 may be implemented even when it is not used.

In addition, although not illustrated in the disclosure, the display apparatus 1 may be horizontally unfolded or folded as well as vertically. Even in this case, since the plurality of link members 400 may be folded or unfolded symmetrically around the center, thereby implementing a smooth and flexible operation of the apparatus.

While the disclosure has been illustrated and described with reference to various example embodiments, it will be understood that the various example embodiments are intended to be illustrative, not limiting. Those skilled in the art will understand and appreciate that various modifications, additions and substitutions are possible, without departing from the true spirit and full scope of the disclosure, including the accompanying claims. Accordingly, such modifications, additions and substitutions should also be understood to fall within the scope of the disclosure.

What is claimed is:

1. A display apparatus comprising:
a first plate including a first display panel and a first link member, wherein the first link member includes a first internal link configured to move in a longitudinal direction of the first link member;
a second plate including a second display panel and a second link member, wherein the second link member includes a second internal link configured to move in a longitudinal direction of the second link member; and
a hinge member rotatably connecting the first link member to the second link member to thereby rotatably connect the first display panel to the second display panel,
wherein at least one of the first internal link and the second internal link includes:
a first opposing link including a first rack,
a second opposing link including a second rack facing the first rack, and
a pinion gear interlocking the first opposing link and the second opposing link.

2. The display apparatus of claim 1, wherein the hinge member includes a first hinge connected to the first internal link, and a second hinge connected to the second internal link.

3. The display apparatus of claim 2, wherein the first hinge and the second hinge have a common rotation axis,
wherein the first hinge includes a first connecting bar connected to the second internal link and the second hinge includes a second connecting bar connected to the first internal link, and
wherein a connection of the first connecting bar connected to the first internal link is spaced apart from the common rotation axis.

4. The display apparatus of claim 2, wherein the first link member further includes side walls disposed on both sides of the first internal link, and
wherein the second hinge is connected to the side walls.

5. The display apparatus of claim 4, wherein each of the side walls includes a groove, and the first hinge is movably connected to the respective grooves of the sidewalls.

6. The display apparatus of claim 4, further comprising:
an auxiliary rail including a fixed member fixed to a side wall of the plurality of sidewalls and a moving member configured to move along the fixed member;
wherein the first internal link is connected to the moving member of the auxiliary rail.

7. The display apparatus of claim 1, further comprising:
an arm member connected to the first link member; and
a driving source configured to move the arm member,
wherein the arm member includes:
a first arm including a first end connected to the driving source, and
a second arm including a first end rotatably connected to a second end of the first arm and a second end connected to the link member.

8. The display apparatus of claim 7, wherein the driving source is a linear motor.

9. The display apparatus of claim 7, wherein the arm member further includes an auxiliary arm connected to the second end of the first arm and the first end of the second arm.

10. The display apparatus of claim 1, further comprising:
a supporting member disposed between the first link member and the second link member, and configured to support the hinge member; and
an auxiliary driving source configured to move the supporting member.

11. The display apparatus of claim 10, wherein the auxiliary driving source is a linear motor, and
wherein the auxiliary driving source further includes a rotation bar including a first end rotatably connected to the linear motor and a second end rotatably connected to the supporting member.

12. The display apparatus of claim 1, wherein each of the first plate and the second plate include a containing groove,
wherein the first link member and the second link member are contained in the containing grooves of the first plate and the second plate, respectively.

13. The display apparatus of claim 1, wherein each of the first display panel and the second display panel further includes a plurality of micro LEDs.

14. The display apparatus of claim 1, further comprising a fixed frame configured to support a rotation axis of at least one of the pinion gear of the first internal link and the pinion gear of the second internal link.

15. The display apparatus of claim 1, wherein the first link member is configured to be substantially aligned with the second link member when the first display panel and the second display panel are adjoined.

16. The display apparatus of claim 1, wherein the first plate and the second plate are configured to move from a folded position where the first display panel and the second display panel are separated on opposite sides of the first plate and the second plate, to an unfolded position where the first display panel and the second display panel are adjoined and aligned on a same side of the first plate and the second plate.

17. The display apparatus of claim 16, wherein the display apparatus is configured such that when the display apparatus moves from the folded position to the unfolded position, a counter-clockwise rotation of the first link member causes the hinge member to push the first opposing links away from the hinge member to rotate the pinion gears and pull the second opposing links toward the hinge member, which causes a clockwise rotation of the second link member to thereby smoothly unfold the display apparatus.

* * * * *